United States Patent Office 2,979,476
Patented Apr. 11, 1961

2,979,476

METHOD OF BLENDING POLYSTYRENE AND WAX

Richard B. Bishop, Leominster, and James S. Pavlin, Fitchburg, Mass., assignors to Foster Grant Co., Inc., Leominster, Mass., a corporation of Delaware No Drawing. Filed Mar. 19, 1958, Ser. No. 722,386

3 Claims. (Cl. 260—28.5)

This invention relates to polystyrene-containing compositions. More particularly, it relates to stable compositions comprising polystyrene and a wax, which compositions are particularly well suited for the manufacture of phonograph records.

Polystyrene, although having excellent molding, visual, and electrical characteristics, is considered somewhat deficient in certain mechanical properties, such as flexibility, impact-resistance, heat-resistance and surface-resistance. Therefore, when used in uncompounded form for a phonograph record, for example, polystyrene is considered to have a poor acoustic response, poor wearing characteristics, and to be too brittle. Where compatible compounding ingredients are dispersed by mechanical mixing, the physical properties of polystyrene can be substantially improved. Such compatible compounding ingredients include, for example, certain polymers, resins, pigments, plasticizers and fillers. However, many other compounding ingredients which would desirably be incorporated into polystyrene to give good record compositions e.g. a wax, normally have either no compatibility or such limited compatibility as to render them useless.

Polystyrene compositions suitable for molding into phonograph records in which a normally non-compatible percentage of a wax is incorporated are known. For example, Groff U.S. 2,681,323 discloses the preparation of such a molding composition by intensive mixing of more than compatible amounts of a wax with polystyrene at 160 to 225° C. for 10 minutes to an hour, depending on the equipment. As disclosed, this process yields a stable dispersion of the wax throughout the polystyrene mass which can be molded without the wax migrating or sweating out to the molded surface. However, this process has one severe disadvantage—the high cost of such mixing at elevated temperatures. In another process, Hermann et al., U.S. 2,127,381, small percentages of wax are incorporated into vinyl compounds by polymerization of the vinyl monomer in the presence of the wax. However, such a process also requires intensive agitation at these high temperatures to provide products free of migration or sweating out of the wax to the surface of the molded article. (See U.S. 2,681,323, column 3.)

One object of this invention is to provide a process of producing stable, uniform compositions of polystyrene with a normally non-compatible amount of a wax without the requirement of intensive agitation at high temperature. Other objects of this invention will be found in the description and claims which follow.

In accordance with this invention we have found that stable, uniform compositions of polystyrene containing a normally non-compatible amount of wax can be prepared by catalytically partially polymerizing styrene monomer in bulk, dispersing the wax in the heated polymer-monomer mix, and then completing the polymerization in the substantial absence of agitation. The resultant material is a stable, uniform composition which can be easily granulated for molding, extrusion and the like. By this process as much as 15% of a wax can be incorporated into polystyrene to form a stable, uniform composition having improved properties. In the manufacture of phonograph records, the range of wax content which gives the best balance of physical properties for phonograph records is 4% to 6%. In particular, polystyrene-wax compositions are provided which can be used to produce phonograph records of greatly improved acoustic response, wear-resistance, and shatter-resistance.

While the degree of monomer conversion, prior to addition of the wax-like substance, may vary within broad limits, the most effective range of polymerization has been found to lie between 15% and 60% conversion. Within this range of conversion, the wax material can be added and then the polymerization brought to completion to give the desired composition. The extent of the conversion is determined by periodic examination of samples for refractive index at 25° C.

The waxes found eminently suitable in producing phonograph records in accordance with the present invention include but are not limited to natural waxes (e.g. candelilla, carnauba, montan, beeswax, myrtle, Japan), synthetic (e.g. micro-crystalline, Fischer-Tropsch) and mineral waxes (e.g. paraffins).

Polymerization is carried out under varying conditions. For example, the temperature of polymerization is dependent upon the catalyst employed. More specifically, excellent control and uniformity are achieved when the partial conversion of monomer in the initial stage is conducted at between 75° C. and 95° C. and the final stage at between 80° C. and 225° C.

The following example is offered by way of illustration and not by way of limitation. All parts and percentages, unless otherwise specified, are by weight.

*Example*

One hundred parts of styrene monomer and 0.21 part of benzoyl peroxide, were charged into a polymerization kettle and the contents heated at 83° C. for three and one-half hours with constant agitation. (Periodic samples were examined for refractive index at 25° C. to determine percent conversion of the styrene to polystyrene.) At 25% conversion, 5 parts of wax consisting of a mixture of about half carnauba and half micro-crystalline waxes were dispersed in the agitated heated mixture over a period of approximately thirteen minutes. 0.083 part of benzoyl peroxide were then added and about seven minutes later the entire mass was transferred to a filter press for completion of the polymerization. The time-temperature cycle in the filter press were, consecutively, 6 hours at 90° C., 5 hours at 120° C. and 7 hours at 160° C. After cooling, the resultant polymer block was removed from the press and ground to a powder. The product, which contained about 5% by weight of wax, was uniform and stable, with no blooming or flashing. When molded in conventional injection molding machines, it molded well and yielded products which were uniform and exhibited no blooming, sweating or flashing.

The products of this invention have been found particularly suitable for phonograph records. Exceptionally wear-resistant, sweat-free and sound-sensitive records are formed when fillers such as carbon black, clay, barytes and bentonite are incorporated.

We claim:

1. A process for providing a stable uniform composition of polystyrene with up to 15% of a wax, comprising heating styrene and polymerization catalyst in bulk to a polymerization conversion of 15% to 60%, dispersing the wax in the polymerizing mix, and then completing the polymerization in the substantial absence of agitation.

2. The process of claim 1, wherein the amount of wax used is 4% to 6% by weight of the styrene.

3. A process for providing a stable, uniform composition of polystyrene and wax suitable for use as a phonograph record molding composition, comprising heating 100 parts of styrene and polymerization catalyst in bulk at a temperature of 75° C. to 95° C. to a polymerization conversion of about 25%, dispersing 4 to 6 parts of a wax in the polymerizing mix, and then completing the polymerization at a temperature of 80° to 225° C. in the substantial absence of agitation.

References Cited in the file of this patent

UNITED STATES PATENTS

| | | |
|---|---|---|
| 2,127,381 | Herrmann | Aug. 16, 1938 |
| 2,353,228 | Ducca | July 11, 1944 |
| 2,588,660 | Roche et al. | Mar. 11, 1952 |
| 2,670,308 | Graff et al. | Feb. 23, 1954 |
| 2,681,323 | Graff et al. | June 15, 1954 |
| 2,750,349 | O'Herren | June 12, 1956 |
| 2,752,315 | Knettel | June 26, 1956 |
| 2,779,744 | Groff et al. | Jan. 29, 1957 |
| 2,830,962 | Potter et al. | Apr. 15, 1958 |

OTHER REFERENCES

The Condensed Chemical Dictionary, Fifth Edition, published by Reinhold Publishing Co., New York, 1956, page 880.